Feb. 19, 1957

C. C. ANDES 2,781,524

MOTORIZED BEDS

Filed March 24, 1955

INVENTOR.
Chester C. Andes.
BY
Fishburn & Mullendore
ATTORNEYS.

Feb. 19, 1957  C. C. ANDES  2,781,524
MOTORIZED BEDS

Filed March 24, 1955  3 Sheets-Sheet 2

INVENTOR.
Chester C. Andes.
BY
Fishburn + Mullendore
ATTORNEYS.

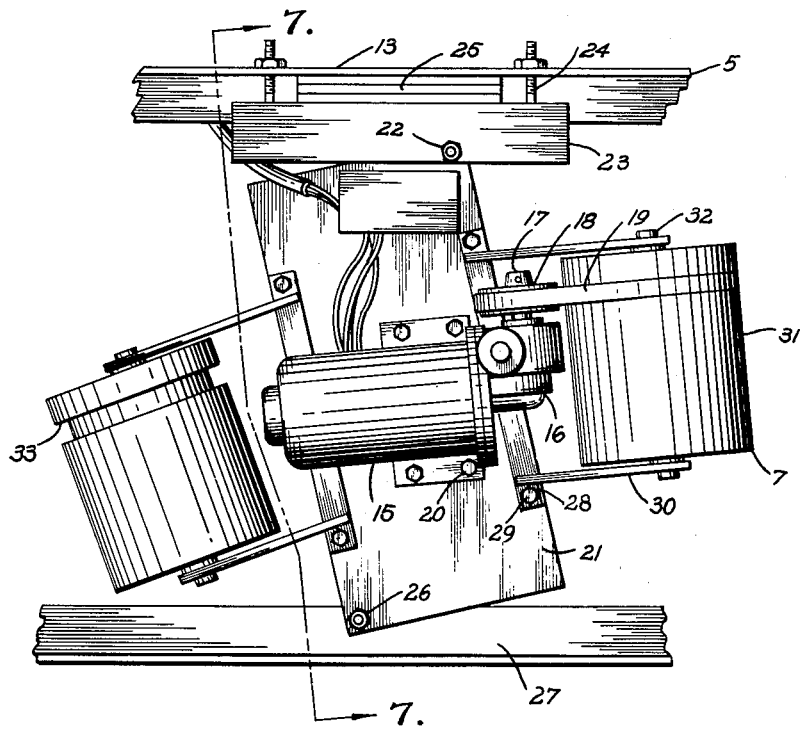
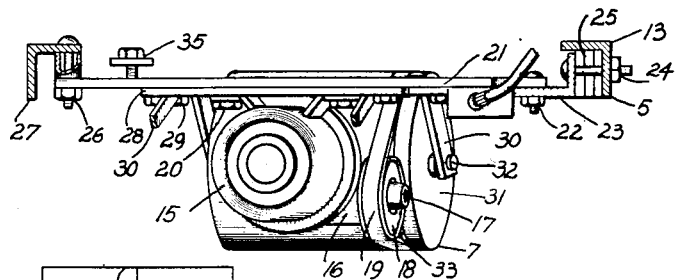
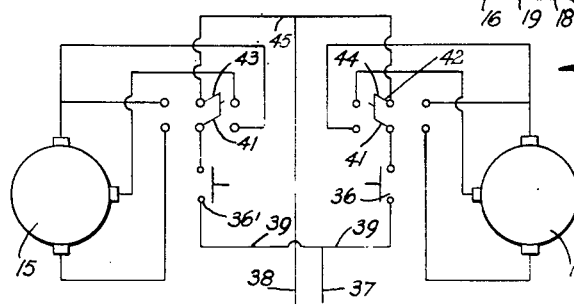

United States Patent Office
2,781,524
Patented Feb. 19, 1957

2,781,524

MOTORIZED BEDS

Chester C. Andes, Independence, Mo.

Application March 24, 1955, Serial No. 496,532

11 Claims. (Cl. 5—8)

This invention relates to motorized beds, and more particularly to a furniture structure for use in hotels, motels, apartments and the like for use either as a divan or as a bed, with power mechanism for moving the seat portion and effecting the conversion.

There have been various arrangements for mounting and moving beds whereby a portion thereof is hidden in a recess and the remaining portion utilized as a divan for daytime comfort. In such devices having power for moving the bed or seat portion, there have been such positive connections in the drive that a mechanic or maintenance man was necessary to effect the disconnection of the drive whereby the bed could be pulled out for cleaning behind and under the bed. Also, in such power mechanisms, the bed provides a hazard in that during movement a child or anything in the way may be upset and injured or damaged by the bed moving thereover. In some structures, there must be tracks and the like permanently fixed to the floor or the casters or wheel supporting the bed move over the rugs or floor coverings on the floor and cause excessive wear in the path of normal movement of the bed.

The objects of the present invention are to provide a motorized, convertible divan-bed structure which eliminates the disadvantages and hazards present in conventional motorized divan-bed structures; to provide a convertible divan-bed structure with a motorized friction drive for moving the bed structure; to provide such a divan-bed structure wherein a motorized drive includes a driven belt having substantial area in engagement with the floor covering whereby operation of the belt effects the desired movement of the bed, and said belt and associated structure supports the weight of at least a portion of the bed; to provide a pair of divan-bed structures connected together and provided with motorized drives for selectively moving the bed structures in pre-determined paths; to provide such a structure wherein the beds are moved in arcuate paths without having any permanent fixture secured to the floor; to provide such a divan-bed structure whereby the bed may be moved manually as desired; to provide such a structure and drive with movement limiting members and an electric circuit for control of the movement of the bed; and to provide a convertible divan-bed structure with a motorized drive which is economical to manufacture, efficient in operation and easily moved or operated for cleaning there-around.

In accomplishing these and other objects of the present invention, I have provided improved details of construction, the preferred forms of which are illustrated in the accompanying drawings, wherein:

Fig. 6 is a bottom view of the drive mechanism with the belt removed.

Fig. 7 is a sectional view through the drive mounting on line 7—7, Fig. 6.

Fig. 8 is a diagrammatic view of the electrical circuit for the bed moving drives.

Figure 1:
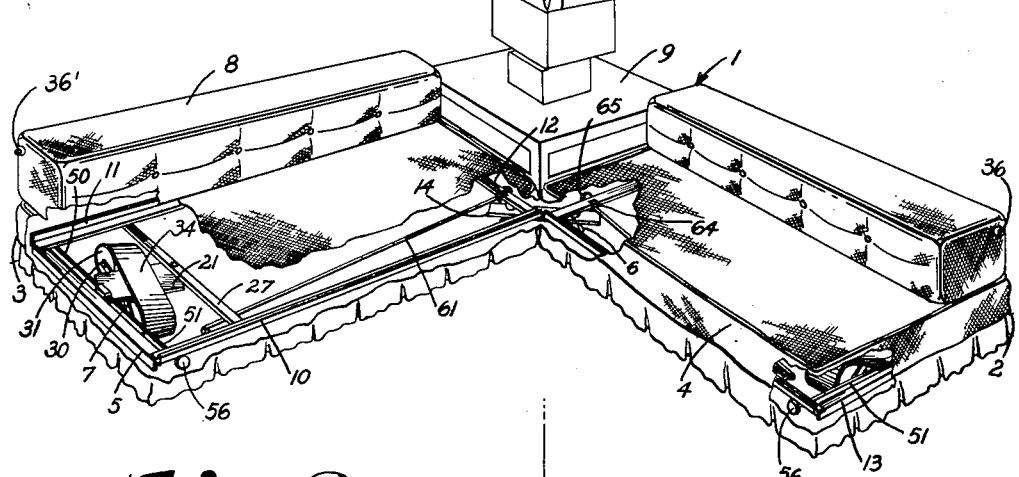
Fig. 1 is a perspective view of a pair of convertible divan-bed structures in divan position with portions broken away to illustrate the arrangement of the bed moving apparatus.

Referring more in detail the drawings:

1 designates a convertible divan-bed structure which in the particular embodiment illustrated includes two divan-beds 2 and 3, each of which has a mattress 4 supported on a frame 5, preferably having rollers or casters 6 at one end and a drive mechanism 7 at the other end engaging the floor or floor covering to movably support the frame. The divan-bed structures also include back cushions 8 which may be mounted as desired, and in the illustrated structure said cushion is mounted on the adjacent walls of the room. It is preferred that the divan-bed structures be arranged one on one wall and one at the other wall of a corner of the room and a table or the like 9 be used to fill in the space between the divan-beds and the corner as illustrated in Figs. 1 and 2.

Figure 2:
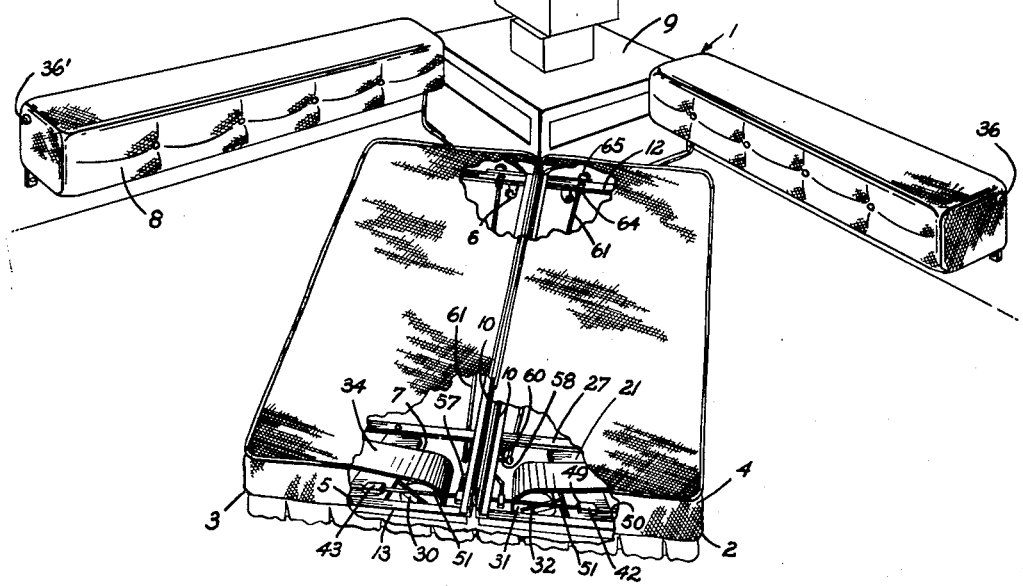
Fig. 2 is a perspective view of the pair of convertible divan-bed structures with both beds moved into a position for use as beds.

It will be convenient to refer to the divan position of parts as being that position which they occupy when such parts are made up to serve as a divan as illustrated in Fig. 1 wherein a portion of the mattresses 4 extend under the back cushions 8, and similarly it will be convenient to refer to the bed position of parts as being that position which they occupy when the bed is ready for use as in Fig. 2. However, it is to be understood that while two associated divan-beds are illustrated, one such structure may be used and even though there are two associated together the bed portions may be independently operated and used as beds. The part referred to as a mattress 4 includes a conventional mattress unit and spring unit not shown, the structure of which forms no part of the present invention.

The bed frames 5 each preferably include longitudinal rails 10 and 11 and transverse end rails 12 and 13 and such other conventional bracing as desires to form a rigid structure to support the mattress and spring structure of the bed. The bed frames are arranged with the end rail 12 adjacent to table 9 and the end rail 11 toward the adjacent wall. The rollers 6 are in the form of casters that are suitably mounted on the frame adjacent the ends thereof toward the table 9. In the illustrated structure, the rollers or casters are mounted on the end rails 12 and engage the floor covering to support that end of the bed frame, the other end of the bed frame being supported by the bed-moving mechanism 7 as later described, whereby the bed frames are moved in a pre-determined path from the divan position to the bed position and back again.

Figure 3:
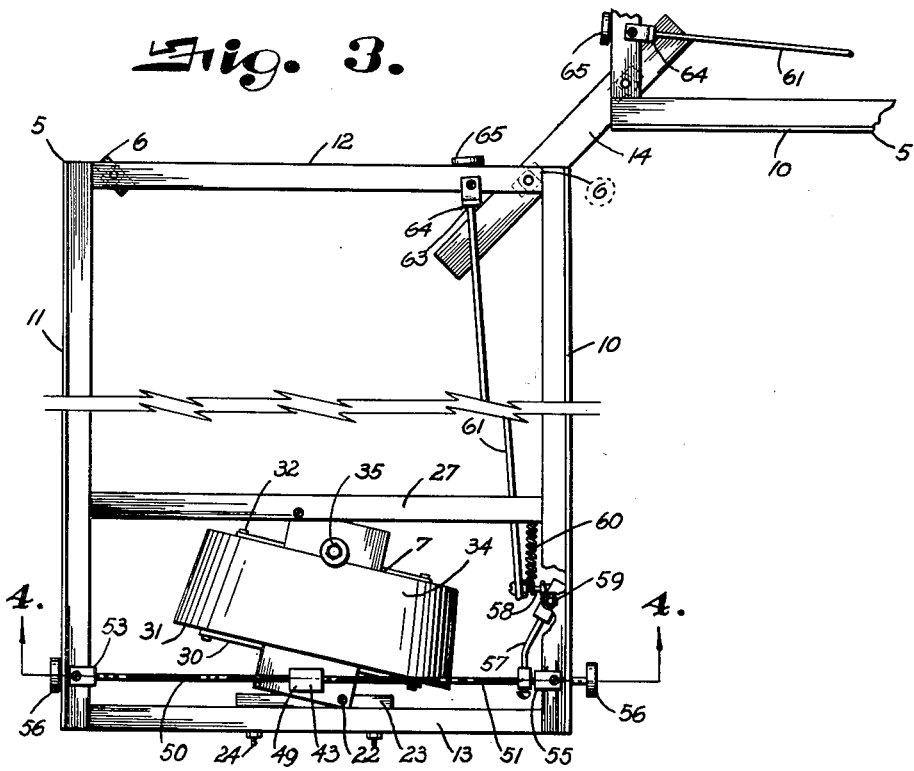
Fig. 3 is a plan view of the bed frame and motorized drive and the connection to the other bed of the pair.
Figure 4:
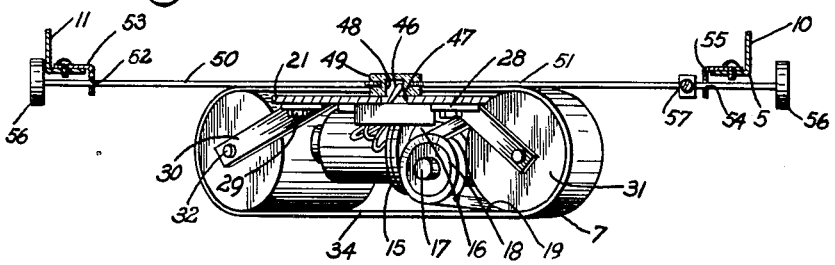
Fig. 4 is a transverse sectional view through the bed frame on the line 4—4, Fig. 3.
Figure 5:
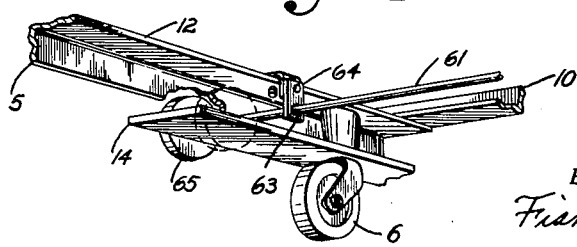
Fig. 5 is a perspective view of a limit control lever and its connection with the bed.

When two divan-bed structures are utilized and positioned as shown in Figs. 1 and 2, and it is desired to swing the beds in an arcuate path, it is preferable that the bed frames be connected together at their adjacent corners. A suitable connector for such purpose consists of a bar 14 pivotally mounted on each of the casters adjacent said corners whereby the pivotal mountings are spaced as illustrated in Fig. 3 to permit the bed portions to swing about the pins of said casters as axes whereby the beds will move together as illustrated in Fig. 2. However, it has been found that by proper positioning of the bed moving apparatus 7, the beds can be swung about said caster pins as axes with no fastening devices between the beds or connection between the beds and the floor.

Also, a plurality of bed moving means can be utilized on each bed frame and operated to move the beds in other selected paths.

The bed moving apparatus each includes a reversible electric motor 15 operatively connected through a gear reduction unit 16 to a drive shaft 17 having a pulley 18 mounted thereon in fixed relation thereto, the pulley 18 preferably being a sheave for driving a V-belt 19. The motor and gear reduction unit are mounted as by fastening devices 20 on a plate 21 having one end secured by a suitable fastening device 22 to a bracket 23 adjustably mounted by bolts 24 and spacers 25 to the end rail 13. The other end of the plate 21 is fixed by suitable fastening devices 26 to a transverse member 27 preferably arranged substantially parallel to the rail 13 and in spaced relation thereto, the ends of the transverse member 27 being suitably secured to the side rails 10 and 11. The motor 15 and gear reduction unit 16 are preferably on the underside of the plate 21 and said plate also spaced below the upper edges of the frame rails whereby the bed moving mechanism is all below the matteress and spring unit 4 and will operate thereunder even when the weight of a person is on the bed unit.

Brackets 28 are suitably secured at opposite sides of the under face of the plate 21 by suitable fastening devices 29. Each of the brackets 28 include spaced outwardly and downwardly extending arms 30. Elongated rollers or drums 31 are rotatably supported by the arms 30, said rollers 31 preferably being between the arms 30 and rotatably carried on shafts 32 having their ends mounted in the arms 30. The rollers 31, brackets 28, and supporting structure therefor are preferably of such size and arrangement whereby the bottom of the rollers 31 are spaced slightly from the floor when the upper surface of the end member 13 is substantially level with the upper surface of the end member 12 with the rollers 5 engaging the floor covering. The axes of the rollers 31 and shafts 32 are in angular relation and converge whereby they intersect at the pivot point of the bed frame which in the particular structure illustrated is the axis of the roller shank extending through the plate 14. Each of the rollers 31 have grooves 33 therein of suitable size to receive the belt 19 whereby the rollers are interchangeable. The belt 19 is operatively engaged in the groove 33 of one of the rollers whereby operation of the motor 15 and gear reduction unit 16 rotates the pulley 18 to drive the respective roller 31, the groove 33 is of such size that the outer surface of a portion of the belt 19 extending around the roller is substantially even with the remainder of the surface of said roller.

A belt 34 extends around and operatively connects the rollers 31, said rollers being of such size that the upper run of the belt 34 operates over the plate 21 and the lower run engages the floor covering. Due to the angular arrangement of the rollers 31, the belt 34 is cut and then secured together whereby one edge of the belt is shorter than the other, or in other words, the periphery of the belt when removed from the rollers 31 would define a frustrum of a cone. In the particular arrangement illustrated, the belt tends to remain on the rollers 31; however, as an added safety feature, it is preferable to provide a stop in the form of an abutment or roller 35 on the upper portion of the plate 21 in engagement with the short side of the belt as illustrated in Fig. 3 to resist any tendency of the belt to work off from the rollers 31. The arrangement of the bolts 24, spacers 25 and fastening devices 22 and 26 is such that they may be varied by changing or adding spacers to adjust the positioning of the plate 21 and the rollers 31 thereon to obtain accurate positioning of the axes of the shafts 32 relative to the pivot point of the bed frame and also the engagement of the belt 34 with the floor surface to obtain a level condition of the bed frame.

The motors 15 are on each of the beds 2 and 3, and the electric controls therefor include switches 36 and 36' preferably of the push button type for the beds 2 and 3 respectively. The switches 36 and 36' are shown in the ends of the back cushions 8; however, they may be mounted in any suitable, accessible place. The electric circuit, as illustrated in Fig. 8, includes leads 37 and 38 connected to a suitable source of electric current; for example, a 110 volt D. C. circuit. Lead 37 is connected by branches 39 to contacts of the switches 36 and 36', the other contacts of said switches being connected to one blade 41 of each of double-throw, double pole switches 42 and 43 for the beds 2 and 3 respectively. The other blade 44 of the switches 42 and 43 are connected by branches 45 to the lead 38. The switches 42 and 43 have contacts connected to the terminals of the motors 15 whereby throwing of the switches 42 and 43 in one direction will operate the motors 15 respectively, and throwing the switches 42 and 43 in the opposite direction will reverse said motors. In the particular structure illustrated, the switches 42 and 43 are mounted on the under side of the plates 21 and the operating lever 46 therefor extends upwardly through an opening 47 in said plate into a recess 48 of a block 49 slidably mounted on the upper face of the plate 21, whereby movement of the block transversely of the bed frame operates the switch. The switch operating mechanism includes rods 50 and 51 having ends suitably secured in the block 49 and extending therefrom in opposite directions, the rod 50 extending through an aperture 52 in a bracket 53 supported on the side member 11, and the rod 51 extending through an aperture 54 in a bracket 55 supported on the side member 10. Stop or abutment members 56 are secured to the ends of the rods 50 and 51 and arranged relative to the side members 10 and 11 whereby when the stop 56 on the rod 50 is engaged with the side rail 11 of the bed 3, the switch 43 is in position for operation of the motor 15 to swing the bed outwardly from the adjacent wall and when the stop member 56 is in engagement with the side rail 10 of said bed, the switch member 43 is in position for operation of the motor 15 to move the bed toward the adjacent wall.

A link 57 has one end secured to the rod 51 and the other end secured to an arm 58 pivotally mounted as at 59 on the side rail 10. A spring 60 has one end connected to the arm 58 and the other end connected to the bed frame, for example, the transverse member 27, to urge the arm 58 toward the end member 12. The end of the arm 58 is connected to a rod 61 which extends through an aperture 63 in a bracket 64 hingedly mounted on the end rail 12, a stop or abutment member 65 being secured to the end of the rod 61 and in position whereby when the respective bed is operated to swing same outwardly into the room, the stop 65 will engage the plate 14 and continued swinging movement of the bed will effect relative movement between the bed and the rod 61 whereby said rod pulls the arm 58 to move the link 57 and rod 51 to shift the block 49 and to throw the switch whereby the outward swinging movement of the bed stops at approximately 45°. If further swinging movement of the bed is desired, the bracket 64 is hinged upwardly to release the stop 65 from engagement with the plate 14 whereby the switch can be operated for further swinging movement.

In operating a bed structure, constructed as described, and assuming the beds are each in divan position, the switch 36' is pressed to complete the circuit to the respective motor 15 causing same to operate to rotate the pulley 18 and drive the roller 31 through the belt 19; driving of the roller 31 operates the belt 34 which frictionally engages the floor covering and moves the bed 3 outwardly from the adjacent wall as long as the circuit is maintained or until the limit member 65 engages the bar 14. If continued swinging movement is desired, the bracket 64 is hinged upwardly to release the stop member 65 from the plate 14 and the spring 60 will then cause the switch 42 to be moved into position for continued operation. Then further pressing of the switch 36' will cause the bed to swing outwardly as long as the circuit is maintained or until the stop member 56 engages the stop member 56 of the bed 2 moving the rod 51 and block 49 to throw the switch 42 to effect reversing of the motor 15. Then continued pressing of the switch 36' would cause the bed to swing toward the wall. In the same manner, the switch 36 may be pressed to operate the motor 15 to swing the bed 2 outwardly into the room. If both beds are swung outwardly, they will assume a position as shown in Fig. 2 at which time they are in bed position; therefore, either or both of the beds may be moved to bed position as desired. When the stop members 56 or 65 are suitably engaged to reverse the respective switches pressing the switches 36 and 36' will cause the beds to swing back toward divan position and this movement will continue as long as the circuit is maintained or until the stop member 56 engages the adjacent wall to throw the switches 42 and 43 to effect reversing of the motors, at which time the structure would be in divan position.

If a child or other object is in the path of the bed, resistance to further movement will cause slippage in the friction drive between the pulleys and belts or rollers and stop further movement of the bed, thereby reducing possibility of injury. With the swinging movement of the beds as described, it is easy to clean behind and under the bed portion by operating the electric circuits to effect desired movement of said beds. While the arrangement of the drive shown is for swinging the beds about selected pivotal axes, it is believed obvious that the bed moving apparatus, and particularly the rollers 31 and belts 34, may be varied to provide straight line movement or movement in other desired paths and still maintain the moving apparatus in a manner wherein it is of suitable size and location relative to the end of the bed to support the weight of same without danger of tipping or rocking due to the movement of a person on the bed.

It is believed obvious I have provided a bed arrangement and drive which is economical to manufacture, efficient in operation, completely safe as well as being easily maneuvered for cleaning and the like.

What I claim and desire to secure by Letters Patent is:

1. In a divan-bed structure, a bed, means supporting one end of the bed for pivotal movement about a vertical axis adjacent said one end, spaced elongate rollers under the bed with the axes of said rollers in a substantially horizontal plane and spaced transversely of the frame, said rollers axes converging at an acute angle to a point on said vertical axis, an endless flexible band extending around and operatively engaged with the spaced rollers, means rotatably mounting the spaced rollers on the bed whereby the lower run of said flexible band engages a floor on which the bed is movable, said spacing of the rollers being such that the rollers and band thereon cooperate to maintain the bed in substantially level condition, and power means operatively connected with at least one of the spaced rollers for rotating same and driving the flexible band for moving said other end of the bed.

2. In a divan-bed structure, a frame having sides and end members, a mattress supported on the frame, means at one end of the frame for supporting same for pivotal movement in a plane parallel to the floor of a room containing the divan-bed structure and about a vertical axis adjacent said one end, spaced elongate rollers under and adjacent the other end of the frame with the axes of said rollers in a substantially horizontal plane and spaced transversely of the frame, said roller axes converging at an acute angle toward a point on said vertical axis, an endless flexible band extending around and operatively engaged with the spaced rollers, means rotatably mounting the spaced rollers on the bed frame whereby the lower run of the flexible band engages a floor on which the bed frame is movable, said spacing of the rollers being such that the rollers and band thereon cooperate with the frame supporting means at said one end of the bed frame to maintain the bed frame in substantially level condition, power means carried by the frame, and frictional power transmission means operatively connecting the power means and at least one of the spaced rollers for rotating same and drving the flexible band for moving said other end of the frame.

3. In a divan bed structure, a frame having sides and end members, a mattress supported on the frame, means at one end of the frame for supporting same for pivotal movement in a plane parallel to the floor of a room containing the divan-bed structure and about a vertical axis adjacent said one end, spaced elongate rollers under and adjacent the other end of the frame with the axes of said rollers substantially in a horizontal plane and spaced transversely of the frame, said roller axes converging at an acute angle toward said vertical axis, an endless flexible band extending around and frictionally engaged with the spaced rollers, means rotatably mounting the spaced rollers on the bed frame whereby the lower run of the flexible band engages a floor on which the bed frame is movable, said spacing of the rollers being such that the rollers and band thereon cooperate with the frame supporting means at said one end of the bed frame to maintain the bed frame in substantially level condition, power means carried by the frame, frictional power transmission means operatively connecting the power means and at least one of the spaced rollers for rotating same and driving the flexible band for moving said other end of the frame, and control means for the power means for limiting movement of said other end of the frame.

4. In a divan-bed structure, a frame having side and end members, a mattress supported on the frame, divan back members, means supporting the divan back members in overhanging relation to a portion of the mattress when the frame is in divan position, means at one end of the frame for supporting said one end for pivotal movement in a plane parallel to the floor of the room containing the divan-bed structure, and about a substantially vertical axis adjacent said one end and spaced from said divan back members, spaced elongate rollers under and adjacent the other end of the frame with the axes of the rollers substantially in a horizontal plane and spaced transversely of said frame, said roller axes converging at an acute angle toward said vertical axis, means rotatably mounting the spaced rollers on the frame whereby the lower periphery of said spaced rollers are adjacent the floor of the room, said spacing of the rollers being such that said rollers cooperate with the frame-supporting means at said one end of the frame to maintain the bed frame in substantially level position, a relatively wide flat endless band having one side edge longer than the other and extending around and frictionally engaging said spaced elongate rollers whereby the lower run of said endless band engages the floor between said rollers, power means carried by the frame, frictional power transmission means operatively connecting the power means and at least one of the spaced rollers for rotating same and moving said other end of the frame, and means controlling the direction of movement of the power means.

5. In a divan-bed structure, a frame having side and end members, a mattress supported on the frame, divan back members, means supporting the divan back members in overhanging relation to a portion of the mattress when the frame is in divan position, means at one end of the frame for supporting said one end for pivotal movement in a plane parallel to the floor of the room containing the divan-bed structure and about a vertical axis adjacent said one end, spaced elongate rollers under and adjacent the other end of the frame with the axes of the rollers spaced transversely of said frame, said roller axes converging at an acute angle toward said vertical axis, a relatively wide flat endless flexible band extending around and operatively engaged with said spaced rollers, said band having one side edge longer than the other, means rotatably mounting the spaced rollers on the frame whereby the lower run of said flexible band engages the floor of the room, said spacing of the rollers being such that the rollers and band thereon cooperate with the frame-supporting means at said one end of the frame to maintain the bed frame in substantially level position, power means carried by the frame, frictional power transmission means operatively connecting the power means and at least one of the spaced rollers for rotating same and driving the flexible band for moving said other end of the frame, means controlling the direction of movement of the power means, spaced stationary abutment means in the room containing the bed frame, and means on the frame cooperating with the stationary abutment means in the room for limiting movement of the frame by the power means.

6. In a divan-bed structure, a frame having side and end members, a mattress supported on the frame, divan back members, means supporting the divan back members in overhanging relation to a portion of the mattress when the frame is in divan position, spaced means at one end of the frame for supporting said one end for pivotal movement in a plane parallel to the floor of the room containing the divan-bed structure, spaced elongate rollers under and adjacent the other end of the frame with the axes of the rollers spaced transversely of said frame and converging at an acute angle to a point substantially at one of the spaced frame supporting means at said one end of the frame, a relatively wide flat endless flexible band having one side edge longer than the other and extending around frictionally engaged with said spaced rollers, means rotatably mounting the spaced rollers on the frame whereby the lower run of said flexible band engages the floor of the room, said spacing of the rollers being such that the rollers and band thereon cooperate with the frame supporting means at said one end of the frame to maintain the bed frame in substantially level position and power means operatively connected with at least one of the spaced rollers for rotating same and driving the flexible band for swinging movement of the other end of the frame about the point at which the converging axes of the rollers intersect.

7. In a divan-bed structure, a frame having side and end members, a mattress supported on the frame, divan back members, means supporting the divan back members in overhanging relation to a portion of the mattress when the frame is in divan position, spaced means at one end of the frame for supporting said one end for pivotal movement in a plane parallel to the floor of the room containing the divan-bed structure, spaced elongate rollers under and adjacent the other end of the frame with the axes of the rollers in a substantially horizontal plane and spaced transversely of said frame and converging at an acute angle to a point substantially at one of the spaced frame supporting means at said one end of the frame, a relatively wide flat endless flexible band extending around and frictionally engaged with said spaced rollers, said endless band being longer along one side edge than the other whereby the width of said band engages the peripheries of said rollers, means rotatably mounting the spaced rollers on the frame whereby the lower run of said flexible band engages the floor of the room, said spacing of the rollers being such that the rollers and band thereon cooperate with the frame supporting means at said one end of the frame to maintain the bed frame in substantially level condition, power means carried by the frame, and frictional power transmission means operatively connecting the power means and at least one of the spaced rollers for rotating same and driving the flexible band for swinging movement of the other end of the frame about the point at which the converging axes of the rollers intersect.

8. In a divan-bed structure, a frame having side and end members, a mattress supported on the frame, divan back members, means supporting the divan back members in overhanging relation to a portion of the mattress when the frame is in divan position, spaced means at one end of the frame for supporting said one end for pivotal movement in a plane parallel to the floor of the room containing the divan-bed structure, spaced elongate rollers under and adjacent the other end of the frame with the axes of the rollers in a substantially horizontal plane and spaced transversely of said frame and converging at an acute angle to a point substantially at one of the spaced frame supporting means at said one end of the frame, a relatively wide flat endless flexible band extending around and frictionally engaged with said spaced rollers, said flexible band having one side edge longer than the other, means rotatably mounting the spaced rollers on the frame whereby the lower run of said flexible band engages the floor of the room, said spacing of the rollers being such that the rollers and band thereon cooperate with the frame supporting means at said one end of the frame to maintain the bed frame in substantially level condition, power means carried by the frame, frictional power transmission means operatively connecting the power means and at least one of the spaced rollers for rotating same and driving the flexible band for swinging movement of the other end of the frame about the point at which the converging axes of the rollers intersect, means controlling the direction of movement of the power means, spaced stationary abutment means in the room containing the frame, and means on the frame cooperating with the stationary abutment means in the room for limiting movement of the frame by the power means.

9. In a divan-bed structure, a pair of single bed frames each having side and end members, a mattress supported on each of the bed frames, divan back members, means supporting the divan back members in overhanging relation to portions of the mattresses when the frames are in divan position, said frames being in angular relation with the corner with one end of one frame adjacent to a corner of the other frame when in divan position, spaced means at the adjacent ends of the frames for supporting said adjacent ends for pivotal movement in planes parallel to the floor of a room containing the divan-bed structures, means pivotally connecting the adjacent frame supporting means at the adjacent ends of the frames, spaced elongate rollers under and adjacent the other ends of the frames with the axes of the rollers in a substantially horizontal plane and spaced transversely of the respective frames, the axes of the rollers on the respective frames converging at acute angles to points substantially at the one of the spaced frame supporting means adjacent the adjacent corners of the bed frames, a relatively wide flat endless flexible band extending around and frictionally engaged with said spaced rollers on each of the frames, means rotatably mounting the spaced rollers on each of the frames whereby the lower runs of said flexible bands engages the floor of the room, said spacing of the rollers being such that the rollers and bands thereon cooperate with the frame supporting means at the adjacent ends of the frames to maintain the frames in substantially level condition, electric motors carried by each of the frames and operatively connected with at least one of the spaced rollers on the respective frames for rotating same and driving the flexible band for moving the other ends of the frames to swing same about the point of intersection of the converging axes of the spaced rollers on the respective frames, and an electric circuit for energizing the motors and including switch means for controlling the direction of movement of the respective electric motors.

10. In a divan-bed structure, a pair of single bed frames each having side and end members, a mattress supported on each of the bed frames, divan back members, means supporting the divan back members in overhanging relation to portions of the mattresses when the frames are in divan position, said frames being in angular relation with a corner with one end of one frame adjacent to a corner of the other frame when in divan position, spaced means at the adjacent ends of the frames for supporting said adjacent ends for pivotal movement in planes parallel to the floor of a room containing the divan-bed structures, means pivotally connecting the adjacent frame supporting means at the adjacent ends of the frames, spaced elongate rollers under and adjacent the other ends of the frames with the axes of the rollers in a substantially horizontal plane and spaced transversely of the respective frames, the axes of the rollers on the respective frames converging at acute angles to points substantially at the one of the spaced frame supporting means adjacent the adjacent corners of the bed frames, a relatively wide flat endless flexible band extending around and frictionally engaged with said spaced rollers on each of the frames, means rotatably mounting the spaced rollers on each of the frames whereby the lower runs of said flexible bands engage the floor of the room, said spacing of the rollers being such that the rollers and bands thereon cooperate with the frame supporting means at the adjacent ends of the frames to maintain the frames in substantially level condition, electric motors carried by each of the frames and operatively connected with at least one of the spaced rollers on the respective frames for rotating same and driving the flexible band for moving the other ends of the frames to swing same about the point of intersection of the converging axes of the spaced rollers on the respective frames, an electric circuit for energizing the motors and including switch means for controlling the direction of movement of the respective electric motors, spaced stationary abutment means in the room containing the divan-bed structure, and means operatively connected with the switch means and cooperating with the stationary abutment means in the room for limiting movement of the respective frames by the electric motors and operating the switches to effect reversing of electric motors when said means engages the abutment means.

11. In a divan-bed structure, a pair of single bed frames each having side and end members, a mattress supported on each of the bed frames, divan back members, means supporting the divan back members in overhanging relation to portions of the mattresses when the frames are in divan position, said frame being in angular relation with a corner with one end of one frame adjacent to a corner of the other frame when in divan position, spaced means at the adjacent ends of the frames for supporting said adjacent ends for pivotal movement in planes parallel to the floor of a room containing the divan-bed structures, means pivotally connecting the adjacent frame supporting means at the adjacent ends of the frames, spaced elongate rollers under and adjacent the other ends of the frames with the axes of the rollers in a substantially horizontal plane and spaced transversely of the respective frames, the axes of the rollers on the respective frames converging at acute angles to points substantially at the one of the spaced frame supporting means adjacent the adjacent corners of the bed frames, a relatively wide flat endless flexible band extending around and frictionally engaged with said spaced rollers on each of the frames, means rotatably mounting the spaced rollers on each of the frames whereby the lower runs of said flexible bands engage the floor of the room, said spacing of the rollers being such that the rollers and bands thereon cooperate with the frame supporting means at the adjacent ends of the frame to maintain the frames in substantially level condition, electric motors carried by each of the frames, power transmission means including gear reduction units and a friction drive operatively connecting the electric motors with at least one of the spaced rollers on the respective frames for rotating same and driving the flexible band for moving the other ends of the frames to swing same about the point of intersection of the converging axes of the spaced rollers on the respective frames, an electric circuit for energizing the motors and including switch means for controlling the direction of movement of the respective electric motors, spaced stationary abutment means in the room containing the divan-bed structure, means operatively connected with the switch means and cooperating with the stationary abutment means in the room for limiting movement of the respective frames by the electric motors and operating the switches to effect reversing of electric motors when said means engages the abutment means, and second switch means in circuit with each of the electric motors for controlling energization of the electric motors.

References Cited in the file of this patent

UNITED STATES PATENTS

| | | |
|---|---|---|
| 2,590,337 | McNabb et al. | Mar. 25, 1952 |
| 2,602,937 | Frey | July 15, 1952 |
| 2,620,041 | Chenette et al. | Dec. 2, 1952 |